(12) United States Patent
Kruse et al.

(10) Patent No.: US 12,325,442 B2
(45) Date of Patent: *Jun. 10, 2025

(54) SYSTEMS AND METHODS FOR MANAGING SPEED THRESHOLDS FOR VEHICLES

(71) Applicant: SmartDrive Systems, Inc., Westlake, TX (US)

(72) Inventors: Samuel Thomas Kruse, San Diego, CA (US); David Wagstaff, San Diego, CA (US); Jason Palmer, San Diego, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,150

(22) Filed: Jan. 17, 2024

(65) Prior Publication Data
US 2024/0149901 A1    May 9, 2024

Related U.S. Application Data

(63) Continuation of application No. 18/066,073, filed on Dec. 14, 2022, now Pat. No. 11,945,462, which is a continuation of application No. 17/235,877, filed on Apr. 20, 2021, now Pat. No. 11,565,712, which is a continuation of application No. 16/891,782, filed on
(Continued)

(51) Int. Cl.
| | |
|---|---|
| *B60W 50/14* | (2020.01) |
| *B60W 30/14* | (2006.01) |
| *B60W 50/08* | (2020.01) |
| *G08G 1/00* | (2006.01) |
| *G05D 1/00* | (2006.01) |
| *G05D 1/69* | (2024.01) |

(52) U.S. Cl.
CPC .......... *B60W 50/14* (2013.01); *B60W 30/146* (2013.01); *B60W 50/085* (2013.01); *G08G 1/20* (2013.01); *B60W 2555/20* (2020.02); *B60W 2555/60* (2020.02); *B60W 2756/10* (2020.02); *G05D 1/0291* (2013.01); *G05D 1/69* (2024.01)

(58) Field of Classification Search
CPC .. B60W 50/14; B60W 30/146; B60W 50/085; B60W 2555/20; B60W 2555/60; B60W 2756/10; G08G 1/20; G08G 1/0112; G08G 1/0133; G08G 1/017; G08G 1/052; G08G 1/09626; G08G 1/096775; G08G 1/096716; G08G 1/096741; G05D 1/0291; G05D 1/69
USPC ...................................................... 701/1, 93
See application file for complete search history.

(56) References Cited

U.S. PATENT DOCUMENTS

| | | | |
|---|---|---|---|
| 8,676,466 B2* | 3/2014 | Mudalige | G08G 1/163 |
| | | | 701/32.7 |
| 8,930,040 B2* | 1/2015 | Gompert | H04N 7/185 |
| | | | 701/1 |

(Continued)

*Primary Examiner* — Jaime Figueroa
(74) *Attorney, Agent, or Firm* — Esplin & Associates, PC

(57) ABSTRACT

Systems and methods for managing speed thresholds for a fleet of vehicles are disclosed. Input is used to provide associations between particular weather-relation conditions (such as rain) and arithmetic operations, that may be used to determine a current speed threshold as a function of a local posted speed limit at the current location of a vehicle. The current speed threshold is subsequently used to detect whether vehicles are exceeding the current speed threshold.

13 Claims, 3 Drawing Sheets

Related U.S. Application Data

Jun. 3, 2020, now Pat. No. 10,988,146, which is a continuation of application No. 16/798,231, filed on Feb. 21, 2020, now Pat. No. 10,683,017.

(56) References Cited

U.S. PATENT DOCUMENTS

| | | | |
|---|---|---|---|
| 10,254,764 B2* | 4/2019 | Laubinger | G08G 1/22 |
| 10,328,769 B2* | 6/2019 | Ferguson | G06Q 10/08 |
| 2007/0027583 A1* | 2/2007 | Tamir | H01L 23/49838 |
| | | | 701/1 |
| 2012/0089423 A1* | 4/2012 | Tamir | G08G 1/096741 |
| | | | 701/1 |
| 2012/0109418 A1* | 5/2012 | Lorber | G06Q 50/40 |
| | | | 701/1 |
| 2013/0302758 A1* | 11/2013 | Wright | H04M 1/72454 |
| | | | 701/1 |
| 2013/0332004 A1* | 12/2013 | Gompert | G06F 16/73 |
| | | | 701/1 |
| 2015/0081135 A1* | 3/2015 | Gompert | H04L 67/02 |
| | | | 701/1 |
| 2017/0344023 A1* | 11/2017 | Laubinger | B60W 30/165 |
| 2019/0034857 A1* | 1/2019 | Ferguson | G01C 21/20 |
| 2019/0034967 A1* | 1/2019 | Ferguson | B60R 21/34 |
| 2019/0035044 A1* | 1/2019 | Ferguson | G05D 1/0038 |
| 2020/0058218 A1* | 2/2020 | Julian | G08G 1/04 |
| 2020/0133307 A1* | 4/2020 | Kelkar | G08G 1/22 |

* cited by examiner

| rain 301 | | snow 302 | | ice 303 | | fog 304 | |
|---|---|---|---|---|---|---|---|
| If PSL < 20, | * 1 | If PSL < 20, | * 1 | If PSL < 20, | * 1 | If PSL < 20, | * 1 |
| If 20 <= PSL < 30, | * ¾ | If 20 <= PSL < 30, | * ¾ | If PSL >= 20, | 20 | If 20 <= PSL < 30, | * ½ |
| If 30 <= PSL < 40, | * 2/3 | If 30 <= PSL < 40, | * 2/3 | | | If 30 <= PSL < 40, | - 10 |
| If PSL >= 40, | * 3/5 | If PSL >= 40, | * ½ | | | If PSL >= 40, | * ½ |

*Fig. 3*

SYSTEMS AND METHODS FOR MANAGING SPEED THRESHOLDS FOR VEHICLES

FIELD OF THE DISCLOSURE

The present disclosure relates to systems and methods for managing speed thresholds for fleets of vehicles, and, in particular, the use of speed thresholds that vary dynamically based on particular weather-relation conditions.

BACKGROUND

Monitoring vehicle operations is known, in particular for the occurrence of events such as speeding or collisions. The use of posted speed limits on public roads is known.

SUMMARY

One aspect of the present disclosure relates to a system configured for managing speed thresholds for a fleet of vehicles. The system may include one or more hardware processors configured by machine-readable instructions. The system may be configured to receive input, which may include user input. The input may represent a first association between a first weather-related condition and a first arithmetic operation used to determine a current speed threshold in case a posted speed limit falls within a first range of speed limits. The current speed threshold may be determined as a first function of the posted speed limit by applying the first arithmetic operation to the posted speed limit. The input may further represent a second association between the first weather-related condition and a second arithmetic operation used to determine the current speed threshold in case the posted speed limit falls within a second range of speed limits. The current speed threshold may be determined as a second function of the posted speed limit by applying the second arithmetic operation to the posted speed limit. The system may be configured to detect vehicle events by receiving information that represents the first association and the second association, by obtaining a current vehicle location of the first vehicle, by obtaining weather-related information based on the current vehicle location for at least two different weather-related conditions that include rain, wherein the weather-related information indicates the first weather-related condition is currently present at the current vehicle location, by obtaining information regarding a current posted speed limit, wherein the current posted speed limit is based on the current vehicle location, by determining the current speed threshold based on the current posted speed limit, by obtaining a current speed of the vehicle, and by detecting an occurrence of a vehicle event responsive to the current speed of the vehicle exceeding the current speed threshold. Determining the current speed threshold may include, responsive to the current posted speed limit falling within the first range of speed limits and the first weather-related condition being currently present at the current vehicle location, applying the first arithmetic operation to the current posted speed limit in accordance with the first association. Determining the current speed threshold may further include, responsive to the current posted speed limit falling within the second range of speed limits and the first weather-related condition being currently present at the current vehicle location, applying the second arithmetic operation to the current posted speed limit in accordance with the second association. The system may be configured to, responsive to detection of the occurrence of the current vehicle event, generate one or more notifications regarding the current vehicle event. The system may be configured to provide the one or more notifications to one or more of the vehicle operator, a stakeholder of the fleet of vehicles, and/or a remote computing server obtain output signals conveying information pertaining to the vehicle and to operation of the vehicle.

Another aspect of the present disclosure relates to a method for managing speed thresholds for a fleet of vehicles. The method may include receiving input, which may include user input. The input may represent a first association between a first weather-related condition and a first arithmetic operation used to determine a current speed threshold in case a posted speed limit falls within a first range of speed limits. The current speed threshold may be determined as a first function of the posted speed limit by applying the first arithmetic operation to the posted speed limit. The input may further represent a second association between the first weather-related condition and a second arithmetic operation used to determine the current speed threshold in case the posted speed limit falls within a second range of speed limits. The current speed threshold may be determined as a second function of the posted speed limit by applying the second arithmetic operation to the posted speed limit. The method may include detecting vehicle events by receiving information that represents the first association and the second association, by obtaining a current vehicle location of the first vehicle, by obtaining weather-related information based on the current vehicle location for at least two different weather-related conditions that include rain, wherein the weather-related information indicates the first weather-related condition is currently present at the current vehicle location, by obtaining information regarding a current posted speed limit, wherein the current posted speed limit is based on the current vehicle location, by determining the current speed threshold based on the current posted speed limit, by obtaining a current speed of the vehicle, and by detecting an occurrence of a vehicle event responsive to the current speed of the vehicle exceeding the current speed threshold. Determining the current speed threshold may include, responsive to the current posted speed limit falling within the first range of speed limits and the first weather-related condition being currently present at the current vehicle location, applying the first arithmetic operation to the current posted speed limit in accordance with the first association. Determining the current speed threshold may further include, responsive to the current posted speed limit falling within the second range of speed limits and the first weather-related condition being currently present at the current vehicle location, applying the second arithmetic operation to the current posted speed limit in accordance with the second association. The method may include, responsive to detection of the occurrence of the current vehicle event, generating one or more notifications regarding the current vehicle event. The method may include providing the one or more notifications to one or more of the vehicle operator, a stakeholder of the fleet of vehicles, and/or a remote computing server obtain output signals conveying information pertaining to the vehicle and to operation of the vehicle.

As used herein, any association (or relation, or reflection, or indication, or correspondency) involving servers, processors, client computing platforms, vehicles, vehicle operators, roads, sensors, locations, directions, conditions, associations, operations, determinations, detections, durations, limits, thresholds, recommendations, notifications, vehicle events, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates an exemplary matrix as may be used by a system configured for managing speed thresholds for a fleet of vehicles, in accordance with one or more implementations.

DETAILED DESCRIPTION

Figure 1:
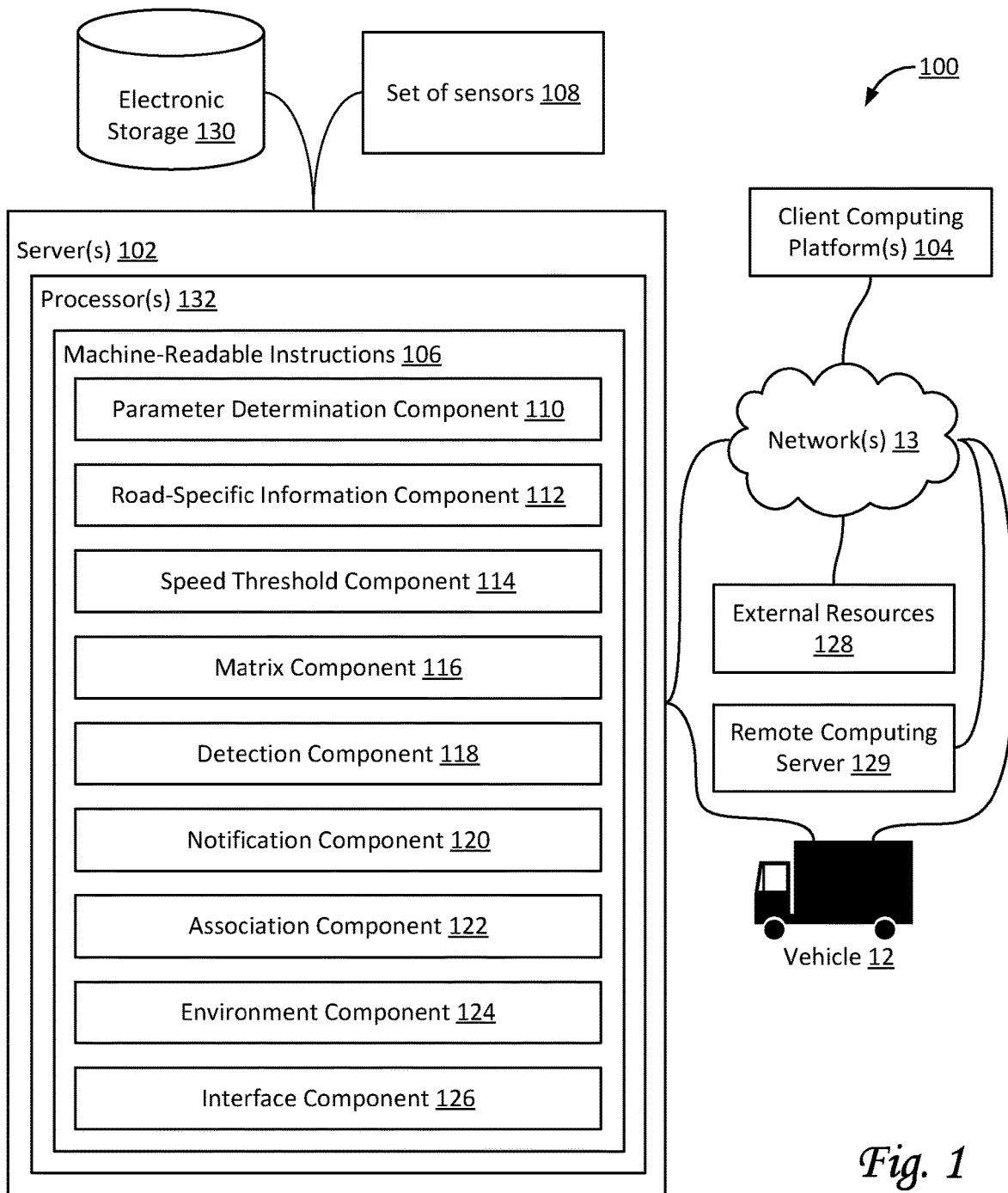
FIG. 1 illustrates a system configured for managing speed thresholds for a fleet of vehicles, wherein the vehicles include a first vehicle, in accordance with one or more implementations.

FIG. 1 illustrates a system 100 configured for managing speed thresholds for a fleet of vehicles, in accordance with one or more implementations. The fleet of vehicles may include a first vehicle 12, a second vehicle, a third vehicle, and so forth. Individual vehicles may be associated with individual vehicle operators. For example, vehicle 12 may be associated with a first vehicle operator, the second vehicle may be associated with a second vehicle operator, the third vehicle may be associated with a third vehicle operator, and so forth. System 100 may be further configured to detect vehicle events based on these speed thresholds. System 100 may be further configured to provide notifications (e.g., warnings) related to these detected vehicle events. In some implementations, a vehicle that uses system 100 may be configured to take certain actions responsive to these detected scenarios, as described elsewhere in this disclosure. In some implementations, system 100 may include one or more vehicles, whereas in other implementations system 100 may exclude the vehicles.

The roads vehicles are on or near may include public roads, private roads, and/or other types of roads. In some implementations, roads may have certain posted speed limits, such as, for example, 20 mph, 30 mph, 40 mph, 50 mph, 65 mph, and/or other speed limits (or ranges of speed limits). In some implementations, a third-party entity (e.g., a government-controlled entity) may provide road-specific information, e.g., an online database, that includes posted speed limits for certain roads.

In some implementations, system 100 may include one or more of servers 102, electronic storage 130, a set of sensors 108, network(s) 13, client computing platform(s) 104, external resources 128, a remote computing server 129, and/or other components. System 100 and/or components thereof may be carried and/or otherwise supported by one or more vehicles (e.g., a first vehicle, a second vehicle, a third vehicle, and so forth), including but not limited to a vehicle 12. Operation of system 100 may be described in the context of a particular vehicle, e.g., vehicle 12, but this is not intended to be limiting. In some implementations, system 100 may operate as described for a fleet of multiple vehicles. In some implementations, individual vehicles (e.g., vehicle 12) may carry and/or otherwise support system 100 and/or components thereof. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Individual vehicles may include a set of resources for information gathering, data processing, and/or electronic storage, including but not limited to persistent storage. Individual vehicles may include sensors (e.g., set of sensors 108 configured to generate and/or otherwise gather data, such as output signals). In some implementations, individual vehicles may be configured to detect vehicle events, e.g., based on output signals generated by set of sensors 108. As used herein, the term "vehicle event" may include occurrences of events involving one or more vehicles. As such, detection of vehicle events may include gathering information by monitoring the operation of one or more vehicles, including but not limited to information related to current or past vehicle speeds, current or current location, and/or other information pertinent to detecting of vehicle events, particularly occurrences of exceeding speed thresholds.

In some implementations, operation of vehicle 12 may be actively and primarily controlled by a vehicle operator (i.e., a human operator). In such a case, a non-human vehicle operator may take over (or be requested to take over) control of the vehicle in certain circumstances. In some implementations, operation of vehicle 12 may be actively and primarily controlled by an autonomous driving algorithm (also referred to as an algorithmic vehicle operator, or a non-human vehicle operator). In such a case, a human vehicle operator may take over (or be requested to take over) control of the autonomous driving algorithm, e.g., responsive to extreme and/or unconventional driving scenarios, or responsive to a failure or error-condition of the autonomous driving algorithm. In some implementations, a human vehicle operator and an autonomous driving algorithm may form a team that controls operations of vehicle 12 together.

Set of sensors 108 may be configured to generate output signals conveying information related to (operation of) vehicle 12, a location of vehicle 12, a vehicle operator of vehicle 12, and/or a context of vehicle 12 (e.g., related to the surroundings of vehicle 12). In some implementations, set of sensors 108 may be carried by vehicle 12. In some implementations, one or more sensors in set of sensors 108 may be external to vehicle 12, such as roadside sensors, sensors embedded in the surface of a road, sensors carried by other vehicles, and/or other sensors. Although set of sensors 108 is depicted in FIG. 1 as a single element, this is not intended to be limiting. In some implementations, set of sensors 108 may be configured to generate output signals continuously, in an on-going manner, and/or at regular or irregular intervals during operation of vehicle 12.

Information related to the operation of vehicle 12 may include feedback information from one or more of the mechanical systems (not shown in FIG. 1) of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 14 may be a vehicle system sensor included in an Engine Control Module (ECM) system of vehicle 12.

In some implementations, set of sensors 108 may generate output signals conveying information related to a vehicle operator of vehicle 12, such as visual information, motion-related information, position-related information, biometric information, medical information, and/or other information. In some implementations, set of sensors 108 may include one or more sensors configured to generate output signals that convey information related to biological activity of the vehicle operator. In some implementations, one or more sensors may be wearable by the vehicle operator. In some implementations, one or more sensors may be placed in physical proximity to the vehicle operator to facilitate monitoring the biological activity of the vehicle operator. The information related to the biological activity of the vehicle operator may include heart rate, respiration rate, verbal expressions, responses to conditions in the physical environment in and/or around vehicle 12, and/or other characteristics of or information about the vehicle operator.

In some implementations, set of sensors 108 may generate output signals conveying information related to the context of vehicle 12, such as information related to the environment in and/or around vehicle 12. The vehicle environment may include spaces in and around an interior and an exterior of vehicle 12. The information related to the context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the context of vehicle 12 may be generated via non-standard aftermarket sensors installed in vehicle 12. Set of sensors 108 may include, for example, one or more of an image sensor, a camera, a video camera, a microphone, an accelerometer, a gyroscope, a geolocation sensor (e.g., a Global Positioning System or GPS device), a radar detector, a magnetometer, lidar (e.g., for measuring distance of a leading vehicle), an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an inertial measurement sensor, a tilt sensor, a motion sensor, a vibration sensor, an ultrasonic sensor, an infrared sensor, a light sensor, a depth sensor, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals may be transferred as one or more streams of data.

As used herein, the terms "camera" and/or "image sensor" may include any device that captures image information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, distance information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. In some implementations, set of sensors 108 may include multiple cameras positioned around the vehicle and synchronized together to provide a 360-degree view of the inside of a vehicle and/or a 360-degree view of the outside of a vehicle. In some implementations, an image sensor may be integrated with electronic storage such that captured information may be (processed and) stored in the integrated embedded storage. In some implementations, a sensor may be configured to transfer captured information to remote electronic storage media, e.g. through "the cloud."

Server(s) 102 may be configured by machine-readable instructions 106. Machine-readable instructions 106 may include one or more instruction components. The instruction components may include computer program components. The instruction components may include one or more of a parameter determination component 110, a road-specific information component 112, a speed threshold component 114, a matrix component 116, a detection component 118, a notification component 120, an association component 122, an environmental component 124, an interface component 126, and/or other instruction components.

Matrix component 116 may be configured to receive input, including but not limited to user input, computed input, and/or other input. In some implementations, the input may represent associations between weather-related conditions and arithmetic operations. The arithmetic operations may be used to determine speed thresholds. In some implementations, the input may represent associations between weather-related conditions and formulas for deriving speed thresholds. In some implementations, one or more associations may correspond to ranges of (posted) speed limits. In some implementations, one or more associations may be independent of posted speed limits. For example, one or more such associations may depend on current vehicle speed, weather conditions, and/or other factors. In some implementations, speed thresholds may be determined and/or otherwise derived as a function of a posted speed limit, e.g., by applying arithmetic operations to posted speed limits. In some implementations, speed thresholds may be determined and/or otherwise based on weather-related conditions. In some implementations, matric component 116 may be configured to manage a matrix of weather-related conditions and speed thresholds.

For example, a first association between a first weather-related condition and a first arithmetic operation may be used to determine a speed threshold in case the posted speed limit falls within a first range of speed limits. For example, a second association between a first weather-related condition and a second arithmetic operation may be used to determine the speed threshold in case the posted speed limit falls within a second range of speed limits. For example, a third association between a second weather-related condition and a third arithmetic operation may be used to determine a speed threshold in case the posted speed limit falls within a third range of speed limits. For example, a fourth association between a second weather-related condition and a fourth arithmetic operation may be used to determine a speed threshold in case the posted speed limit falls within a fourth range of speed limits.

In some implementations, weather-related conditions may include one or more of rain, snow, ice, fog, and/or other weather-related conditions. In some implementations, separate weather-related conditions may be used for different levels of severity of the same type of precipitation. For example, a first condition may be light rain, a second condition may be heavy rain, and a third condition may be torrential rain. For example, a first condition may be light fog having a limited effect on visibility, a second condition may be dense fog having a significant effect of visibility, and a third condition may be thick fog that severely limits visibility. In some implementations, (operations based on) weather-related conditions may vary based on whether there was any precipitation in the past hour (in a particular location). As used herein, the term precipitation may mean one or more of rain, snow, sleet, hail, and/or freezing rain. In some implementations, (operations based on) weather-related conditions may vary based on whether ground temperatures were below freezing in the past hour (in a particular location).

In some implementations, matrix component 116 may receive input from a fleet manager, vehicle owner, and/or other stakeholder of a fleet of vehicles, e.g., through a user interface of a client computing platform. The represented associations (e.g., a matrix of weather-related conditions and speed thresholds) may be distributed across a fleet of vehicles for local vehicle event detection.

Association component 122 may be configured to receive information, including but not limited to information that represents associations (e.g., from matrix component 116), a matrix of weather-related conditions and speed thresholds, and/or other information. In some implementations, association component 122 may operate locally, on individual vehicles in a fleet of vehicles. For example, for vehicle 12, association component may be configured to receive information that represents a first association, a second association, a third association, and so forth.

Parameter determination component 110 may be configured to determine parameters. For example, the parameters may pertain to the operation of vehicle 12, the current speed of vehicle 12, the current location of vehicle 12, the context of or pertaining to vehicle 12, environmental conditions in or near vehicle 12, and/or other parameters. In some implementations, parameter determination component 110 may be configured to obtain information and/or parameters. The obtained information may include one or more of output signals generated by set of sensors 108, parameters determined based on output signals generated by set of sensors 108, information from external resources 128, and/or other information. For example, in some implementations, parameter determination component 110 may be configured to obtain output signals from set of sensors 108 that convey information pertaining to vehicle 12 and to the operation of vehicle 12, and further configured to determine a current speed of vehicle 12 based on the obtained output signals. In some implementations, parameter determination component 110 may be configured to obtain the current speed of vehicle 12 (also referred to as current vehicle speed of vehicle 12). For example, in some implementations, parameter determination component 110 may be configured to obtain output signals from set of sensors 108 that convey information pertaining to the current location of vehicle 12, and further configured to determine the current location of vehicle 12 based on the obtained output signals. In some implementations, parameter determination component 110 may be configured to obtain the current location of vehicle 12 (also referred to as current vehicle location of vehicle 12). In some implementations, parameter determination component 110 may be configured to determine and/or obtain the current orientation and/or heading of vehicle 12, either relative to the nearest road, or using an absolute representation such as a real-world coordinate system.

Environmental component 124 may be configured to obtain current environmental conditions, e.g., based on the current location of vehicle 12. In some implementations, environmental conditions may include weather-related information such as weather-related conditions. In some implementations, environmental conditions may include visibility conditions. In some implementations, environmental conditions may include traffic conditions. Weather-related information may indicate whether certain weather-related conditions are current present at a particular location (e.g., the current vehicle location). Combinations of multiple different types of environmental conditions are envisioned within the scope of this disclosure, such as, by way of non-limiting example, weather conditions, visibility conditions, and traffic conditions. In some implementations, environmental conditions may include road-surface conditions such as wet, dry, icy, and/or other conditions for the surface(s) of one or more particular roads. In some implementations, certain determinations in system 100 may be based, at least in part, on obtained environmental conditions.

Road-specific information component 112 may be configured to obtain road-specific information. For example, the road-specific information may include information for one or more roads near the current location of vehicle 12 (e.g., as determined and/or obtained by parameter determination component 110). In some implementations, the road-specific information may include posted speed limits of the road closest to the current location of vehicle 12, and/or other road-specific information. The types of road may include public roads, private roads, and/or other types of roads. In some implementations, the types of roads may include highways, expressways, city streets, residential streets, and/or other types of roads. In some implementations, the types of roads may include 2-lane highways, 4-lane highways, 6-lane highways, 8-lane highways, multi-lane highways, and/or other types of roads. In some implementations, road-specific information may include how many traffic lanes are heading in each direction, how many traffic lanes in total form the entire road in both directions, and/or other specific information regarding one or more traffic lanes of a particular road. For example, in some implementations, the road-specific information may specify the number and width of the individual traffic lanes of a particular road. In some implementations, road-specific information may be obtained from one or more external databases, e.g., from one or more external resources 128. In some implementations, road-specific information may include and/or be based on GPS information (e.g., a set of GPS coordinates). In some implementations, road-specific information component 112 may be configured to obtain information regarding a current posted speed limit as a function of the current vehicle location of vehicle 12.

Speed threshold component 114 may be configured to make determinations regarding speed thresholds, in particular as related to the current location of vehicle 12. In some implementations, determinations regarding speed thresholds may be based on posted speed limits, in particular based on the current posted speed limit for a current vehicle location. In some implementations, determinations regarding speed thresholds may be based on associations, e.g., as received by association component 122. In some implementations, determinations regarding speed thresholds may be based on the presence of weather-related conditions, e.g., as obtained by environmental component 124. In some implementations, responsive to the current posted speed limit falling within a first range of speed limits and a first weather-related condition being currently present at the current vehicle location, speed threshold component 114 may be configured to determine the current speed threshold by applying the first arithmetic operation to the current posted speed limit in accordance with the first association. In some implementations, responsive to the current posted speed limit falling within a second range of speed limits and a first weather-related condition being currently present at the current vehicle location, speed threshold component 114 may be configured to determine the current speed threshold by applying the second arithmetic operation to the current posted speed limit in accordance with the second association, and so forth.

By way of non-limiting example, FIG. 3 illustrates an exemplary matrix 300 as may be used by system 100. As depicted, matrix 300 includes a column 301 for a particular weather-related condition, in this case rain. Matrix 300 further includes a column 302 for a different particular weather-related condition, in this case snow. Matrix 300 further includes a column 303 for a different particular weather-related condition, in this case ice. Matrix 300 further includes a column 304 for a different particular weather-related condition, in this case fog. Each of the columns 301, 302, 303, and 304 include associations for different ranges of posted speed limits (or "PSL"). For example, column 301 includes four associations for different ranges of PSL: a first range for a PSL below 20 mph, a second range for a PSL between 20 and 30 mph, a third range for a PSL between 30 and 40 mph, and a fourth range for a PSL above 40 mph. The first association includes a first arithmetic operation, the second association includes a second arithmetic operation, the third association includes a third arithmetic operation, and the fourth association includes a fourth arithmetic operation. For example, in case the posted speed limit is below 20 mph, the current speed threshold is determined by multiplying the posted speed limit by 1. In case the posted speed limit is between 20 and 30 mph, the current speed threshold is determined by multiplying the posted speed limit by ¾. In case the posted speed limit is between 30 and 40 mph, the current speed threshold is determined by multiplying the posted speed limit by ⅔. In case the posted speed limit is above 40 mph, the current speed threshold is determined by multiplying the posted speed limit by ⅗.

As another example, column 302 includes four associations for different ranges of PSL: a first range for a PSL below 20 mph, a second range for a PSL between 20 and 30 mph, a third range for a PSL between 30 and 40 mph, and a fourth range for a PSL above 40 mph. The first association includes a first arithmetic operation, the second association includes a second arithmetic operation, the third association includes a third arithmetic operation, and the fourth association includes a fourth arithmetic operation. For example, in case the posted speed limit is below 20 mph, the current speed threshold is determined by multiplying the posted speed limit by 1. In case the posted speed limit is between 20 and 30 mph, the current speed threshold is determined by multiplying the posted speed limit by ¾. In case the posted speed limit is between 30 and 40 mph, the current speed threshold is determined by multiplying the posted speed limit by ⅔. In case the posted speed limit is above 40 mph, the current speed threshold is determined by multiplying the posted speed limit by ½. Arithmetic operations do not need to be restricted to multiplications. For example, column 304 includes a subtraction in case the posted speed limit is between 30 and 40 mph, the current speed threshold is determined by subtracting 10 mph from the posted speed limit. As another example, column 303 includes a constant, such that the current speed threshold is determined as 20 mph in case the posted speed limit is greater than 20 mph. In some cases, the current speed threshold may be determined without being based on a posted speed limit. For example, a particular speed threshold for a particular weather-related condition such as ice or fog, may be a constant or a formula that is independent of a posted speed limit. In some implementations, such a formula may be based on current vehicle speed, visibility, and/or other factors.

Referring to FIG. 1, detection component 118 may be configured to detect vehicle events, including but not limited to vehicle events of vehicle 12. In some implementations, detections by detection component 118 may be based on one or more of the current operation of vehicle 12, information pertaining to vehicle 12, current parameters of vehicle 12 (e.g., as determined by parameter determination component 110), road-specific information, determinations by other components of system 100, and/or other factors, as well as combinations thereof. For example, detection component 118 may be configured to detect occurrences of vehicle events responsive to the current speed of a particular vehicle exceeding the current speed threshold (e.g., as determined by speed threshold component 114) for that particular vehicle in its current vehicle location. In some implementations, operations by detection component 118 may be vehicle-specific. In some implementations, operations by detection component 118 may be performed locally, at individual vehicles.

Notification component 120 may be configured to generate notifications, including but not limited to notifications regarding detected vehicle events. In some implementations, notification component 120 may be configured to provide notifications to one or more of a vehicle operator of vehicle 12, remote computing server 129, one or more manual reviewers, one or more fleet managers, one or more supervisors of the vehicle operator of vehicle 12, and/or other stakeholders. In some implementations, notification component 120 may be configured to generate reports that include information regarding detected vehicle events. For example, notification component 120 may be configured to provide a notification to the vehicle operator of vehicle 12 (e.g., through a user interface within vehicle 12, or through a client computing device associated with the vehicle operator) that warns the vehicle operator regarding a detected vehicle event and/or provides a suggestion to move vehicle 12 further from the nearest road.

Interface component 126 may be configured to generate, effectuate, and/or present user interfaces to users, including but not limited to vehicle operators, vehicle owners, fleet managers, and/or other stakeholders. In some implementations, notifications may be provided through one or more user interfaces in one or more vehicles. In some implementations, interface component 126 may be configured to present a particular user interface on a particular client computing platform to a particular user. In some implementations, a user interface may include one or more controllers, joysticks, track pad, a touch screen, a keypad, touch sensitive and/or physical buttons, switches, a keyboard, knobs, levers, a display, speakers, a microphone, an indicator light, a printer, and/or other interface devices. User interfaces may be configured to facilitate interaction between users and system 100, including but not limited to receiving input from users. In some implementations, received input may, e.g., be used to select how to determine the current speed threshold, or how to detect vehicle events.

In some implementations, server(s) 102, client computing platform(s) 104, and/or external resources 128 may be operatively linked via one or more electronic communication links. For example, such electronic communication links may be established, at least in part, via one or more network(s) 13 such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Remote computing server 129 may be separate, discrete, and/or distinct from individual vehicles (such as vehicle 12), and/or system 100. In some implementations, remote computing server 129 may be configured to receive, analyze, and/or otherwise process information from one or more vehicles, including but not limited to vehicle 12. In some implementations, remote computing server 129 may be configured to receive notifications from vehicle 12.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 110, 112, 114, 116, 118, 120, 122, 124, and/or 126, and/or other components. Processor(s) 132 may be configured to execute components 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, 122, 124, and/or 126 are illustrated in FIG. 1 as being implemented within a single processing unit, in implementations in which processor(s) 132 includes multiple processing units, one or more of components 110, 112, 114, 116, 118, 120, 122, 124, and/or 126 may be implemented remotely from the other components. The description of the functionality provided by the different components 110, 112, 114, 116, 118, 120, 122, 124, and/or 126 described below is for illustrative purposes, and is not intended to be limiting, as any of components 110, 112, 114, 116, 118, 120, 122, 124, and/or 126 may provide more or less functionality than is described. For example, one or more of components 110, 112, 114, 116, 118, 120, 122, 124, and/or 126 may be eliminated, and some or all of its functionality may be provided by other ones of components 110, 112, 114, 116, 118, 120, 122, 124, and/or 126. As another example, processor(s) 132 may be configured to execute one or more additional components that may perform some or all of the functionality attributed below to one of components 110, 112, 114, 116, 118, 120, 122, 124, and/or 126.

Figure 2:
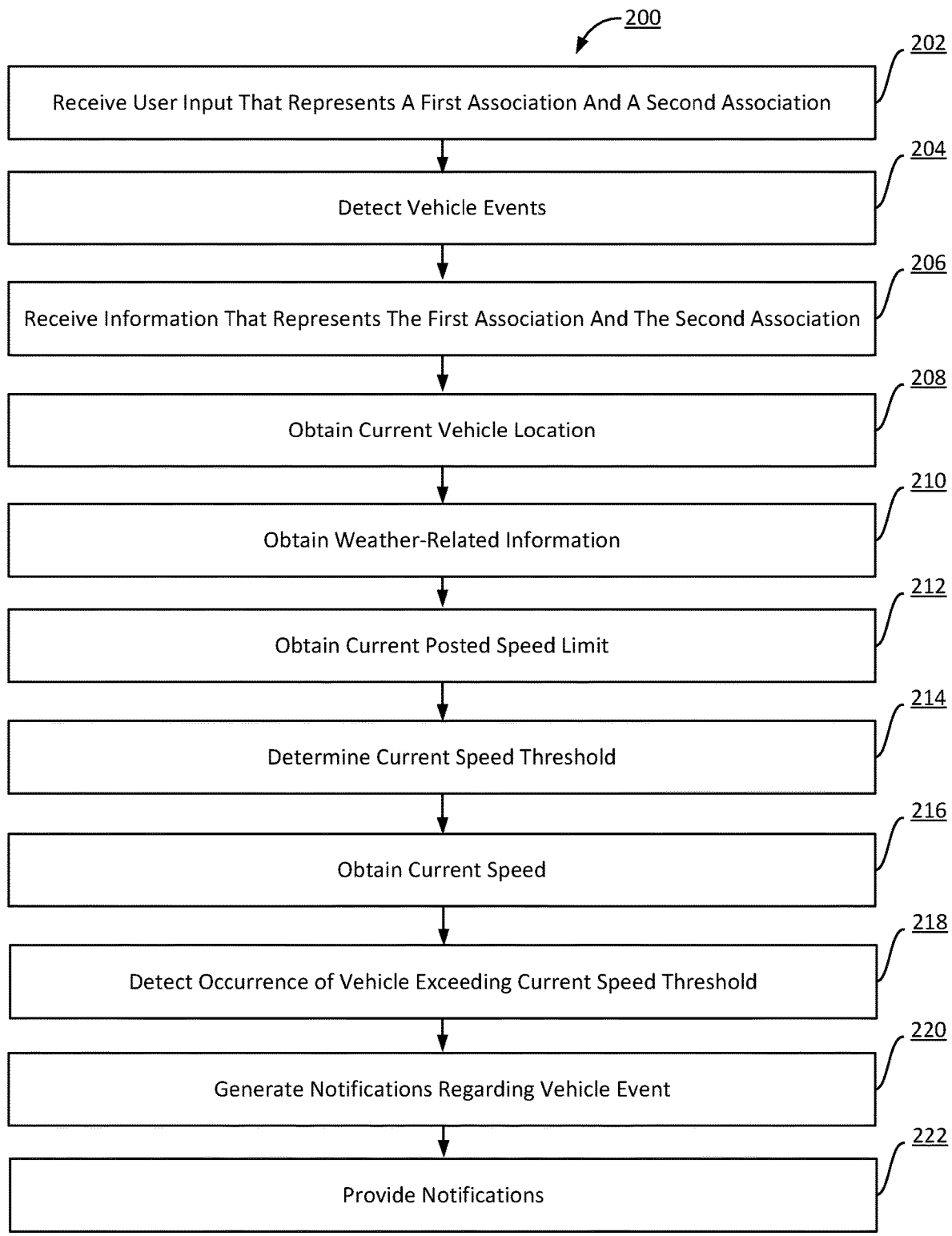
FIG. 2 illustrates a method for managing speed thresholds for a fleet of vehicles, wherein the vehicles include a first vehicle, in accordance with one or more implementations.

FIG. 2 illustrates a method 200 for managing speed thresholds for a fleet of vehicles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, input is received. The input represents a first association between a first weather-related condition and a first arithmetic operation used to determine a current speed threshold in case a posted speed limit falls within a first range of speed limits. The current speed threshold is determined as a first function of the posted speed limit by applying the first arithmetic operation to the posted speed limit. The input further represents a second association between the first weather-related condition and a second arithmetic operation used to determine the current speed threshold in case the posted speed limit falls within a second range of speed limits. The current speed threshold is determined as a second function of the posted speed limit by applying the second arithmetic operation to the posted speed limit. Operation 202 may be performed by a matrix component that is the same as or similar to matrix component 116, in accordance with one or more implementations.

At an operation 204, vehicle events are detected. In some embodiments, operation 204 is performed by a detection component the same as or similar to detection component 118 (shown in FIG. 1 and described herein). In some implementations, vehicle event detection may include operations 206-218.

At an operation 206, information is received that represents the first association and the second association. In some embodiments, operation 206 is performed by an association component the same as or similar to association component 122 (shown in FIG. 1 and described herein).

At an operation 208, current vehicle location of a particular vehicle is obtained. In some embodiments, operation 208 is performed by a parameter determination component the same as or similar to parameter determination component 110 (shown in FIG. 1 and described herein).

At an operation 210, weather-related information is obtained. In some embodiments, operation 210 is performed by an environment component the same as or similar to environment component 124 (shown in FIG. 1 and described herein).

At an operation 212, information is obtained regarding a current posted speed limit. In some embodiments, operation 212 is performed by a road-specific information component the same as or similar to road-specific information component 112 (shown in FIG. 1 and described herein).

At an operation 214, a current speed threshold is determined, in accordance with the first association and the second association (e.g., as a function of the posted speed limit). In some embodiments, operation 214 is performed by a speed threshold component the same as or similar to speed threshold component 114 (shown in FIG. 1 and described herein). As described in this disclosure, the current speed threshold may be based, at least, on the current posted speed limit, present weather-related conditions, and the arithmetic operations that are applied to the current posted speed limit in accordance with the associations received by association component 122.

At an operation 216, a current speed of the vehicle is obtained. In some embodiments, operation 216 is performed by a parameter determination component the same as or similar to parameter determination component 110 (shown in FIG. 1 and described herein).

At an operation 218, an occurrence of the vehicle exceeding the current speed threshold is detected. In some embodiments, operation 218 is performed by a detection component the same as or similar to detection component 118 (shown in FIG. 1 and described herein).

At an operation 220, one or more notifications are generated regarding the detected vehicle event. In some embodiments, operation 220 is performed by a notification component the same as or similar to notification component 120 (shown in FIG. 1 and described herein).

At an operation 222, the one or more notifications are provided to one or more of the vehicle operator and/or a remote computing server (e.g., remote computing server 129). In some embodiments, operation 222 is performed by a notification component the same as or similar to notification component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for managing speed thresholds for a fleet of vehicles, wherein the vehicles include a vehicle located at a current vehicle location, the system comprising:
   electronic storage configured to store information, wherein the information represents a first association between a first weather-related condition and a first arithmetic operation used to determine a given current speed threshold in case a posted speed limit falls within a first range of speed limits, wherein the given current speed threshold is determined by applying the first arithmetic operation to the posted speed limit in case the posted speed limit falls within the first range of speed limits; and an event detector configured to detect vehicle events, wherein the event detector is carried by the vehicle, wherein the event detector includes one or more processors configured by particular machine-readable instructions to:

receive, from a server external to the system, weather-related information for the current vehicle location;

automatically determine, by the one or more processors included in the event detector, a first current speed threshold based on a first current posted speed limit at the current vehicle location, wherein, responsive to the first current posted speed limit falling within the first range of speed limits and further responsive to the first weather-related condition being currently present at the current vehicle location, the first current speed threshold is determined by applying the first arithmetic operation to the first current posted speed limit such that the first current speed threshold is lower than the first current posted speed limit; and automatically detect, by the one or more processors included in the event detector, a first occurrence of a first vehicle event, responsive to a current speed of the vehicle exceeding the first current speed threshold.

2. The system of claim 1, wherein the one or more processors included in the event detector are further configured to:

responsive to detection of the first occurrence of the first vehicle event, generate a first notification regarding the first vehicle event; and provide the first notification to one or more of a vehicle operator, a stakeholder of the fleet of vehicles, and/or a remote computing server.

3. The system of claim 1, wherein the system is further configured to transfer the information that represents the first association to multiple vehicles in the fleet of vehicles, including the first vehicle.

4. The system of claim 1, wherein the weather-related information includes at least one of ice, snow, and fog.

5. The system of claim 1, wherein the one or more processors included in the event detector are further configured to obtain the current vehicle location of the first vehicle, and wherein the first current posted speed limit is obtained as a function of the current vehicle location.

6. The system of claim 1, wherein the weather-related information is related to at least two different weather-related conditions, including separate weather-related conditions for different levels of severity of the same type of precipitation.

7. The system of claim 1, wherein the information further represents a second association between the first weather-related condition and a second arithmetic operation used to determine the given current speed threshold in case the posted speed limit falls within a second range of speed limits, wherein the first range of speed limits is non-overlapping with the second range of speed limits.

8. A method for managing speed thresholds for a fleet of vehicles, wherein the vehicles include a vehicle located at a current vehicle location, and wherein the vehicle includes an event detector that detects vehicle events, the method comprising:

storing information, wherein the information represents a first association between a first weather-related condition and a first arithmetic operation used to determine a given current speed threshold in case a posted speed limit falls within a first range of speed limits;

receiving weather-related information for the current vehicle location from a server external to the vehicle;

automatically determining, by the event detector, a first current speed threshold based on a first current posted speed limit at the current vehicle location, wherein responsive to the first current posted speed limit falling within the first range of speed limits and further responsive to the first weather-related condition being currently present at the current vehicle location, determining the first current speed threshold includes applying the first arithmetic operation to the first current posted speed limit such that the first current speed threshold is lower than the first current posted speed limit; and automatically detecting, by the event detector, a first occurrence of a first vehicle event, responsive to the first current speed of the vehicle exceeding the first current speed threshold.

9. The method of claim 8, further comprising:

responsive to detection of the first occurrence of the first current vehicle event, generating a first notification regarding the first vehicle event; and providing the first notification to one or more of a vehicle operator, a stakeholder of the fleet of vehicles, and/or a remote computing server.

10. The method of claim 8, wherein the weather-related information includes at least one of ice, snow, and fog.

11. The method of claim 8, wherein the information further represents a second association between the first weather-related condition and a second arithmetic operation used to determine the given current speed threshold in case the posted speed limit falls within a second range of speed limits, wherein the first range of speed limits is non-overlapping with the second range of speed limits.

12. The method of claim 8, further comprising:

obtaining the current vehicle location of the vehicle, wherein the first current posted speed limit is obtained as a function of the current vehicle location.

13. The method of claim 8, wherein the weather-related information is related to at least two different weather-related conditions, including separate weather-related conditions for different levels of severity of the same type of precipitation.

* * * * *